C. L. HORACK.
Car-Couplings.

No. 154,950. Patented Sept. 15, 1874.

Witnesses:
P. L. Arnold,
Richard Paulson.

Inventor:
Carl L. Horack

UNITED STATES PATENT OFFICE.

CARL L. HORACK, OF BROOKLYN, NEW YORK.

IMPROVEMENT IN CAR-COUPLINGS.

Specification forming part of Letters Patent No. 154,950, dated September 15, 1874; application filed May 5, 1874.

*To all whom it may concern:*

Be it known that I, CARL L. HORACK, of Brooklyn, State of New York, have invented an Improvement in Car-Couplings, of which the following is a specification:

The object of my invention is to avoid the great expense caused to railroad companies by the loss of links and pins by fastening the same to the draw-bar in the manner hereinafter described, reference being had to the accompanying drawings, forming part of this specification, in which—

Figure 1:
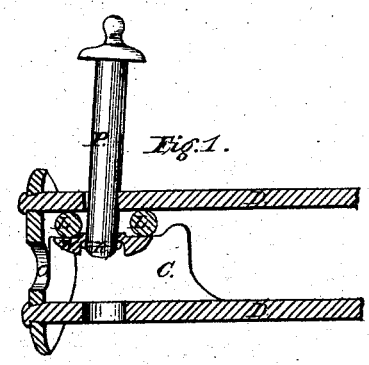
Figure 2:
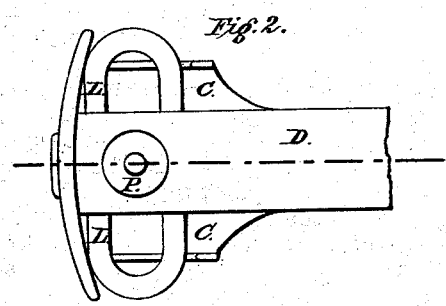

Figure 1 is a longitudinal vertical section of a draw-bar constructed according to my invention. Fig. 2 is a top view of the same.

Similar letters of reference indicate corresponding parts in both figures.

The draw-bar D is, in its general outlines, of the ordinary form. P is the pin, and L the link, both connected in the usual manner. A washer, W, is attached to the pin after its lower end has passed through the upper pin-hole in the draw-bar and through the link. Said washer is so formed that the pin P can slide through the same. Near the lower end of the pin some projection in the form of a rivet, R, or a band, or any similar device for the purpose of securing the washer to the pin, is attached, such projection being small enough to pass through the lower pin-hole in the draw-bar, and to enter the lower part of the hole of the washer W, but sufficiently large enough to retain the washer.

When it is not desired to use the fast link L for coupling purposes, the same can be placed in the position shown in Figs. 1 and 2 by swinging it around and passing it over the cheeks C C of the draw-head, as shown in Fig. 2. Such cheeks may be provided with a projection at the rear part thereof, as indicated in Fig. 1, so as to prevent the link from sliding back in the draw-head.

The lower side of the washer W is sloped in such a manner as to offer no resistance to the entering link when in the act of coupling, and the upper lip of the draw-bar is constructed in such a manner as to protect the fast link L and the upper edge of the washer W from being struck by the entering link.

I claim as my invention—

1. The combination, in the draw-head D, of the washer W, the link L, and pin P, as and for the purpose set forth.

2. The cheeks C C as a support for the stationary link L, substantially as set forth.

CARL L. HORACK.

Witnesses:
P. L. ARNOLD,
RICHARD PAULSON.